United States Patent
Bush

[15] 3,673,894
[45] July 4, 1972

[54] STRIPPING APPARATUS
[72] Inventor: Harold Jesse Bush, Naples, Fla.
[73] Assignee: Thomas & Betts Corporation, Elizabeth, N.J.
[22] Filed: July 23, 1970
[21] Appl. No.: 57,570

[52] U.S. Cl. ............................................. 81/9.51, 7/14.1 R
[51] Int. Cl. ......................................................... H02g 1/12
[58] Field of Search ................... 81/9.51; 29/203 DT; 140/1; 7/14.1 R

[56] References Cited

UNITED STATES PATENTS 2,774,130  12/1956  Folkenroth ........................ 81/9.51 X
3,570,100  3/1971  Kindell et al. ........................... 81/9.51

FOREIGN PATENTS OR APPLICATIONS 403,910  6/1966  Switzerland ........................... 81/9.51

*Primary Examiner*—Theron E. Condon
*Assistant Examiner*—Roscoe V. Parker, Jr.
*Attorney*—David Teschner and Jesse Woldman

[57] ABSTRACT

The invention is directed to an improved pneumatically operated dual-slide planarly rotatable stripping apparatus. Movably coupled to a base member and rotatable towards and away from a stripping zone adjacent thereto is a first slide member upon which is pivotally disposed a pair of adjoining wire stripper means having a pair of cutter blades movably coupled to one end thereof and a first pair of rollers coupled to the other end and operatively engageable with an appropriately slotted camming portion of a second slide member. A second pair of rollers extending outwardly from the sides of the first slide member engage arcuately slotted adjacent portions of the base member permitting the first slide member to advance and rotate away from the stripping zone, permitting the stripped wire to be simply and accurately linearly advanced from the stripping zone to a subsequent station by appropriate transfer means.

21 Claims, 8 Drawing Figures

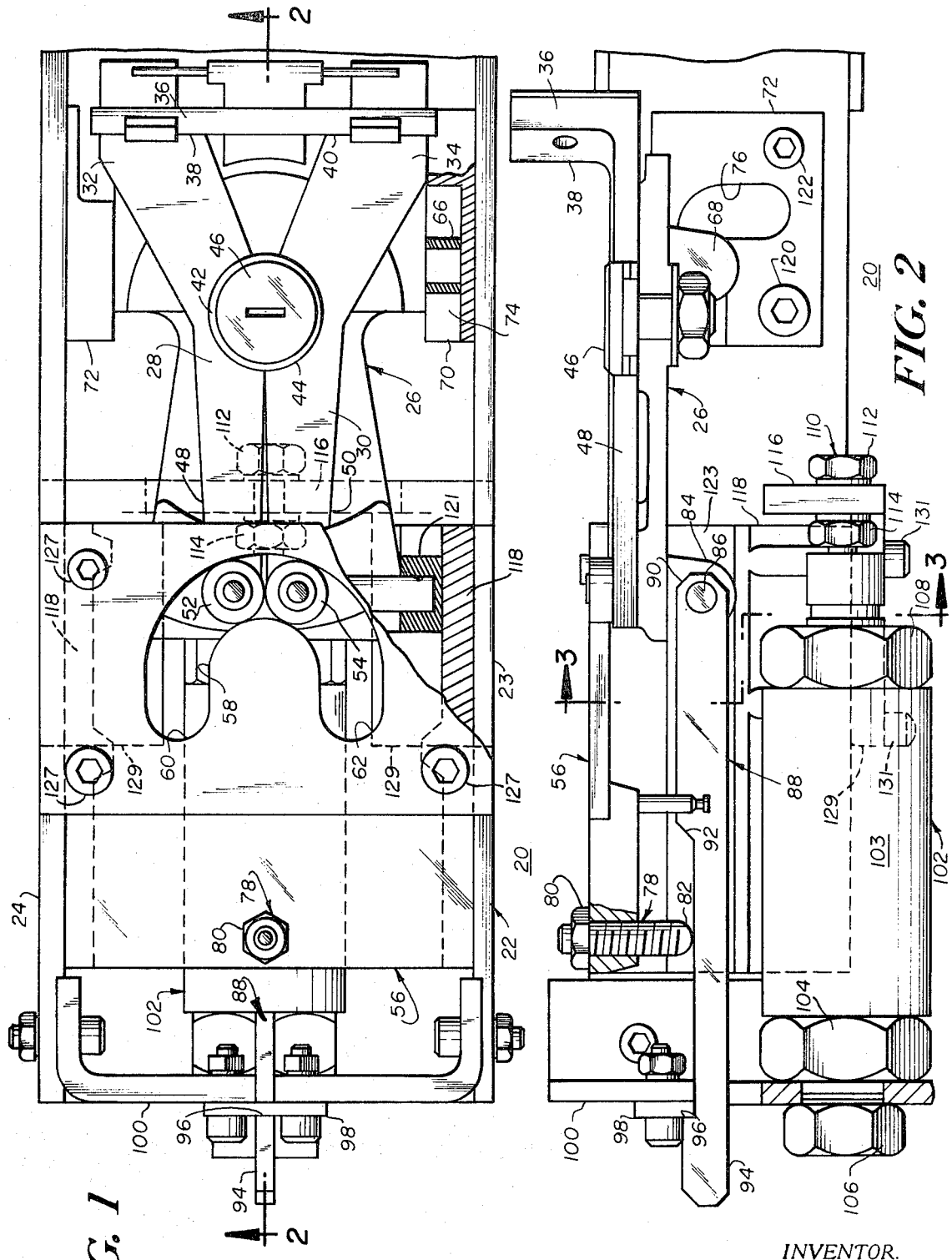

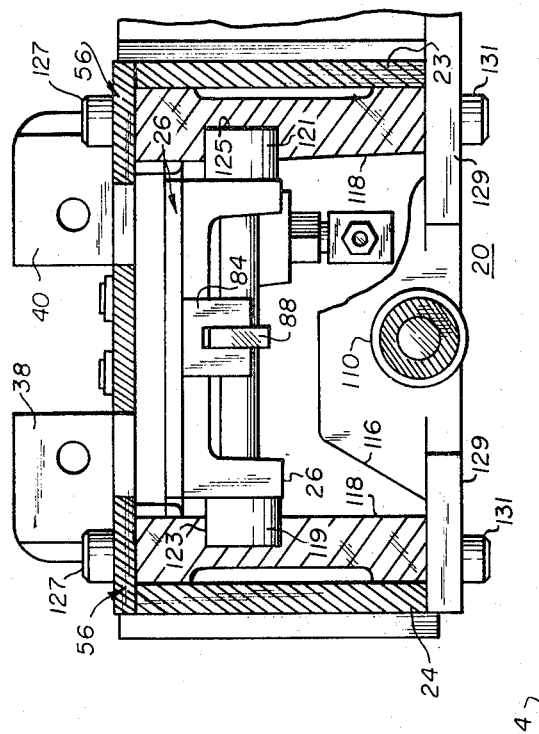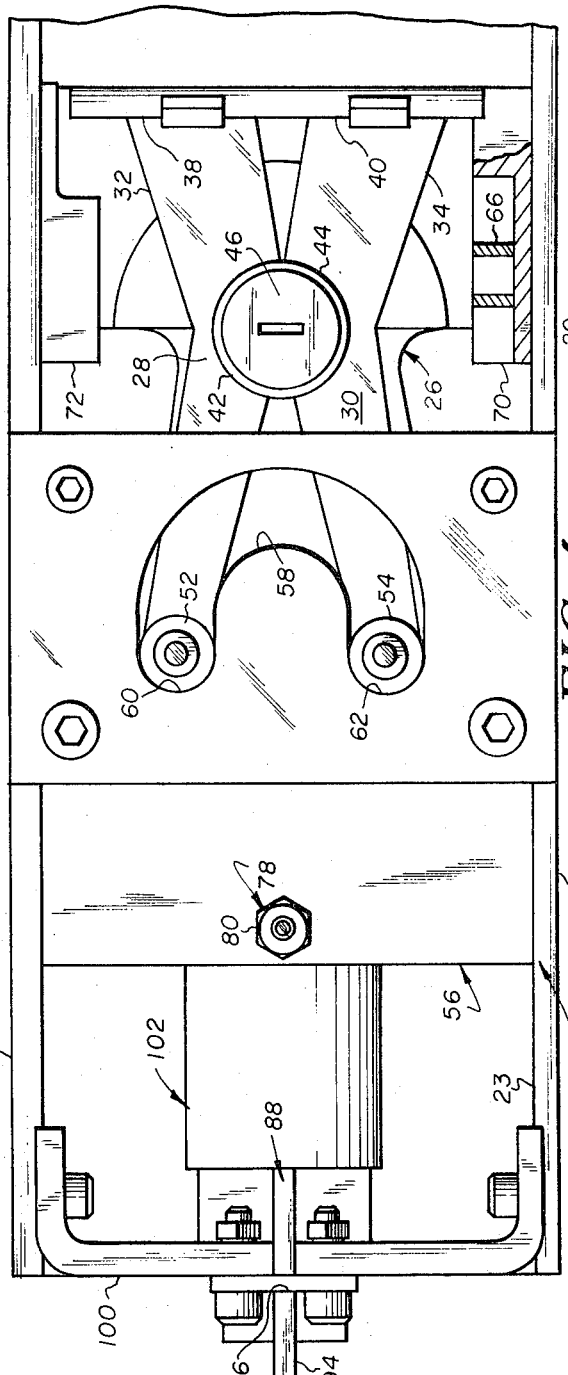

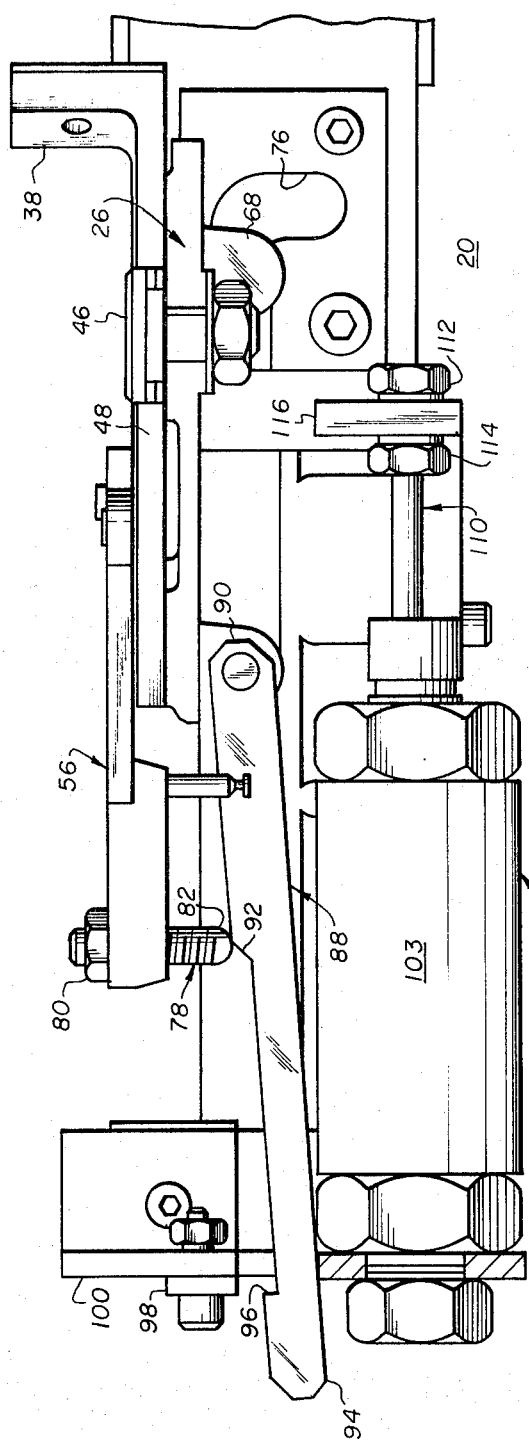
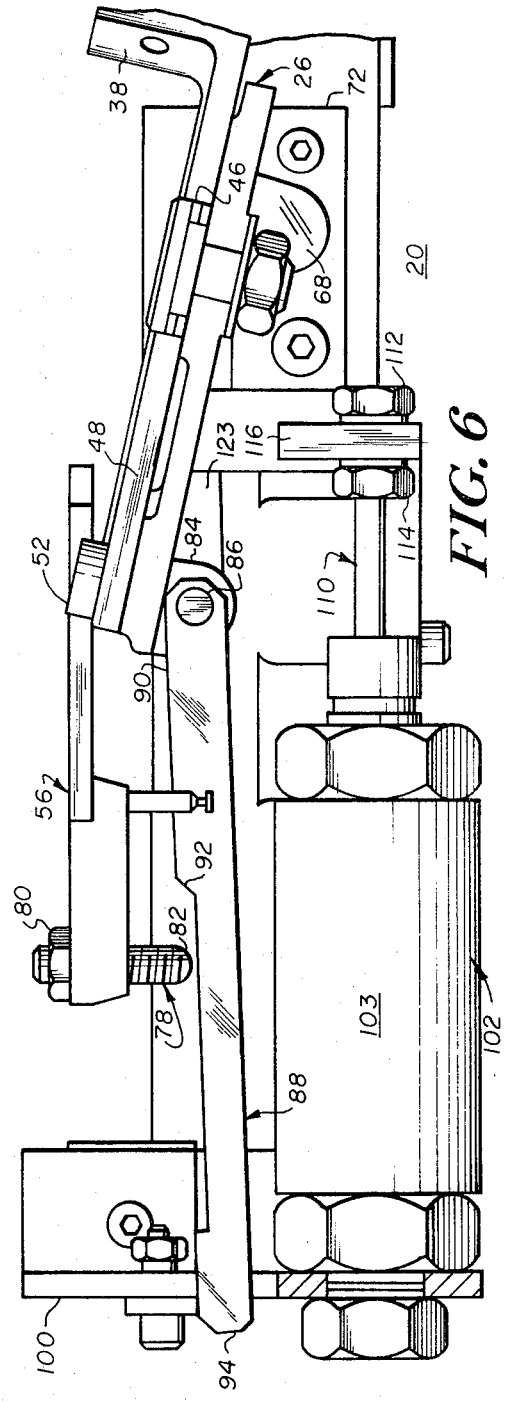

3,673,894

STRIPPING APPARATUS

BACKGROUND OF THE INVENTION

1. Field of the Invention

The invention is directed to the field of stripping apparatus and principally to wire insulation stripping apparatus having a stripping portion planarly rotatable towards and away from a stripping zone.

2. Description of the Prior Art

Wire stripping apparatus according to the prior art generally comprised in one form a pair of adjoining stripper blades laterally operable adjacent a predetermined length of wire from which a selective portion of the insulation thereof was to be removed. In order to perform a subsequent operation on the wire, such as crimping a terminating device to the stripped portion thereof, at an adjacent crimping station, the wire was laterally displaced to clear the stripper blades and then transferred to the crimping station in essentially a two-stage transfer operation. Another form of wire stripping apparatus utilized a generally rotary motion transfer from the stripping station to the crimping station for substantially the same reason, i.e., to avoid the interfering stripper blades during the transfer operation. Because of the accuracy required in locating the stripped end of the wire within the narrowly confined crimp zone at the crimping station, various complex and expensive means were utilized in an attempt to properly position the wire with respect to the receiving portion of the terminal or other terminating device at the crimping station upon its transfer from the stripping zone, such means generally requiring frequent readjustment and alignment to maintain the apparatus in operational condition.

SUMMARY OF THE INVENTION

The invention is directed to an improved stripping apparatus in combination with a wire holding and transfer device which overcomes the problems noted above with respect to prior art devices by providing a slidably mounted stripping apparatus planarly rotatable towards and away from a stripping zone, permitting the stripped wire to be linearly advanced from the stripping zone to a subsequent station by appropriate transfer means that are simpler, less expensive and more accurate than such devices. Movably coupled to a pair of spaced apart upstanding sides of a base member is a slide member upon the upper surface of which is pivotally mounted a pair of adjoining wire strippers. Coupled to a first end of the wire strippers are a pair of cutter blades for cutting the insulation around a selective portion of an insulated wire disposed therebetween. A pair of upstanding rotatable members are coupled to the second end of the wire strippers and are arranged to operably engage a preferably arcuate slotted portion of a drive member movably coupled to the base member. Extending laterally outwardly from opposing sides of the slide member are a pair of preferably roller-like members in cooperable engagement with appropriately slotted adjacent portions of the upstanding sides of the base member, permitting the slide member to be linearly advanced and planarly rotated towards and away from a stripping zone generally adjacent the base member. Pivotally coupled to the slide member generally adjacent its second end is a preferably elongated latch member releasably engageable with a latch receiving device coupled to the base member, to at least partially restrain the forward movement of the slide member during the cutting cycle. A latch release member coupled to the drive member is appropriately positioned adjacent the latch member and is arranged to engagingly cooperate with a selectively formed surface thereof to actuate the latch member and permit the slide member to be advanced in cooperation with a first predetermined forward movement of the drive member and planarly rotated away from the stripping zone in response to a further predetermined forward movement of the drive member. A pneumatically operated actuating means is disposed adjacent the drive member and is movably coupled thereto for the selective, preferably reciprocal displacement thereof. It is therefore an object of this invention to provide an improved stripping apparatus.

It is another object of this invention to provide an improved stripping apparatus permitting the unobstructed linear movement of a stripped wire through a stripping zone adjacent said apparatus.

It is another object of this invention to provide an improved stripping apparatus having stripping means planarly rotatable towards and away from a stripping zone.

It is a further object of this invention to provide an improved stripping apparatus, in combination with a wire holding and transfer means, having stripping means planarly rotatable towards and away from a stripping zone, to permit the linear movement of a stripped wire through said stripping zone.

It is yet another object of this invention to provide an improved stripping apparatus having laterally operable adjoining wire stripping means pivotally coupled to a slide member planarly rotatable towards and away from a stripping zone.

Other objects and features of the invention will be pointed out in the following description and claims and illustrated in the accompanying drawings, which disclose, by way of example, the principle of the invention and the best mode which has been contemplated for carrying it out.

BRIEF DESCRIPTION OF THE DRAWINGS

In the Drawings:

FIG. 1 is a top plan view, partly in section, of a stripping apparatus constructed in accordance with the concepts of the invention.

FIG. 2 is a side elevational view, partly in section, of the apparatus of FIG. 1, taken along the lines 2—2.

FIG. 3 is a rear elevational view, partly in section, of the apparatus of FIG. 1, taken along the lines 3—3.

FIG. 4 is a top plan view of the apparatus of FIG. 1 showing the advancement of the drive means and the resulting lateral closure of the stripping means.

FIG. 5 is a side elevational view of the stripping apparatus of FIG. 4.

FIG. 6 is a side elevational view of the apparatus of FIG. 1 showing the stripping means planarly rotated away from the stripping zone.

Similar elements are given similar reference characters in each of the respective drawings.

DESCRIPTION OF THE PREFERRED EMBODIMENTS

Figure 7:
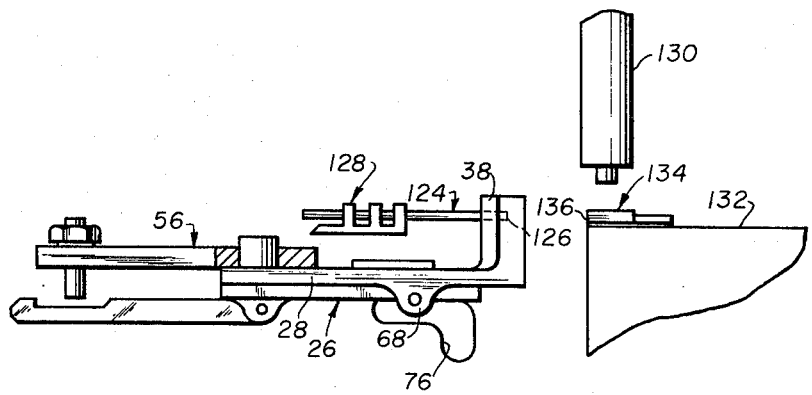
FIG. 7 is a side elevational view, partly in section, of the apparatus of FIG. 1 showing a portion of a typical wire holding and transfer device suitably positioned adjacent thereto and including a typical crimping station forward of the stripping apparatus.

Turning now to FIGS. 1, 2 and 3, there is shown an improved stripping apparatus 20 constructed in accordance with the concepts of the invention. Slidably and rotatably coupled intermediate a pair of generally parallel spaced apart upstanding sides 23, 24 of a base member 22 is a first member 26 upon the upper surface of which is pivotally mounted a pair of laterally separable adjoining wire insulation stripping means 28, 30. Extending laterally outwardly from opposing sides of first member 26 are a pair of rollers 66, 68 slidably engaged within adjacent associated appropriately contoured slots 74, 76, respectively, in cam members 70, 72, respectively, disposed in opposing complementary relationship adjacent rollers 66, 68 and coupled to the upstanding sides 23, 24, respectively, of base member 22. As may be more clearly seen in FIG. 3, a further pair of rollers 118, 121 extend laterally outwardly from the opposing sides of first member 26 generally remote from rollers 66, 68 and are similarly slidably engaged within a respective pair of appropriately contoured slots 123, 125 in sides 23, 24, respectively, of base member 22. The engagement of rollers 66, 68 and 119, 121 within their respective slots thus serve to both support and guide the first member 26 between sides 23 and 24. Extending upwardly intermediate the opposing sides of first member 26 and coupled thereto is a bolt-like member 46 the enlarged head of which serves as a pivot for the pair of stripping means 28, 30 arcuately contoured intermediate their ends to slidingly engage the outer peripheral surface of member 46. First ends 32, 34 of stripping means 28, 30, respectively, have coupled thereto a blade holder 36 within which is slidably disposed a pair of cutter blades 38, 40 (not visible) as commonly employed for cutting through the insulation of an insulated wire each cooperatively engageable with an associated first end 32, 34 of stripping means 28, 30. Each of a pair of generally cylindrical rotatable members 52, 54 is coupled to and extends upwardly from its associated stripping means 28, 30, respectively, adjacent the second end 48, 50 thereof. Slidably mounted to the upstanding sides 23, 24 of base member 22 adjacent the second ends 48, 50 of stripping means 28, 30 is a drive member 56 having a generally arcuate roller engaging slot 58 therein contoured to slidingly receive rotatable members 52, 54. The first end 90 (see FIG. 2) of a generally elongated latch member 88 is pivotally coupled to an apertured bearing member 84 attached to the underside of first member 26 and extends rearwardly towards the rear of base member 22. Adjacent the second end 94 of latch member 88 is a shoulder 96 arranged to releasably engage latch receiving member 98 coupled to the rear wall 100 of base member 22. Extending downwardly from the rear of drive member 56 intermediate the sides thereof is a latch release pin 78 secured to drive member 56 by means of a nut 80 threadably coupled to the upper end of pin 78. The lower end 82 of pin 78 is arranged to contact camming surface 92 of latch member 88 upon a predetermined forward displacement of drive member 56, urging latch member 88 downwardly towards the bottom of FIG. 2 thereby releasing its engagement with latch receiving member 98. Coupled to rear wall 100 of base member 22 by means of inner and outer nuts 104 and 106, respectively, and positioned below drive member 56, is a pneumatic actuation device 102 comprising a cylinder portion 103 and a piston 110 telescopingly slidable within cylinder 103. Affixed to the outwardly extending end of piston 110 and secured thereto by means of nuts 112 and 114 is a connecting member 116 for coupling piston 110 to drive member 56, via member 118, wherein drive support members 56 may be reciprocatingly selectively displaced forwardly, or to the right of FIG. 2, and rearwardly, or to the left of FIG. 2, in response to the correspondingly reciprocating movement of piston 110. The interconnection between connecting member 116, support members 118, and drive member 56 is clearly shown in FIG. 3. As illustrated, the opposing sides of drive member 56 are secured to the adjacent abutting surfaces of support members 118 by means of fasteners 127, members 118 being, in turn, secured to the adjacently disposed, slotted leg portion 129 of connecting member 116 by means of fasteners 131. As is more clearly shown in FIG. 1, rotatable members 52, 54, each of which is coupled to an associated second end 48, 50 of stripping means 28 and 30, respectively, are closely confined within the arcuate slot 58 in drive member 56 and are arranged to traverse the path defined by slot 58 upon the reciprocating movement of drive member 56, thereby laterally displacing stripping means 28, 30 towards and away from each other in cooperation with the selective position of drive member 56.

Turning now to FIGS. 4 and 5, drive member 56 of stripping apparatus 20 is shown advanced forwardly of its position in FIGS. 1, 2 and 3. As a consequence of the forward movement of drive member 56, rotatable members 52, 54 couple to the second ends 48, 50 of stripping means 28 and 30, respectively, have been laterally urged away from each other, traversing their respective portions of camming slot 58 in drive member 56, and pivoting about bolt 46 of first member 26. The first ends 32, 34 of stripping means 28, 30, respectively, are thus caused to be laterally displaced towards each other, the cutting blades 38, 40 (not visible) coupled thereto being brought into suitable disposition for cutting through the insulation of a wire (not shown) interposed therebetween. During the above sequence, latch 88 is maintained in latching engagement with rear wall 100 of base member 22, preventing first member 26 from advancing forward or towards the right of FIG. 4. As drive member 56 is slidably advanced, end 82 of latch release pin 78 is caused to contact camming surface 92 on latch member 88, driving latch 88 downwardly towards the bottom of FIG. 5 and out of engagement with latch receiving member 98 thus permitting first member 26 to be urged forward as the terminating ends 60, 62 of slot 58 contact rotatable members 52, 54. As is more clearly seen in FIG. 5, the movement of drive member 56 is controlled by the advance of piston 110 to which it is coupled, piston 110 being responsive to the pressure exerted on the portion thereof telescopingly engaged within cylinder 102.

Turning now to FIG. 6, there is shown the first member 26 of stripping apparatus 20 planarly rotated away from its position as illustrated in FIGS. 2 and 5. Upon the release of latch member 88, the terminating surfaces 60, 62 of camming slot 58 in drive member 56 bear against the adjacent surfaces of rotatable members 52, 54 urging the coupled combination of the stripping means 28, 30 and first member 26 forward as rollers 66, 68 of first member 26 traverse the horizontal portion of slots 74, 76 in cam members 70, 72. As drive member 56 is further advanced forward or to the right of FIG. 6, rollers 66, 68 are cammingly directed downward, being directionally confined within associated slots 74, 76, causing first member 26 and stripping means 28, 30 pivotally coupled thereto to be planarly rotated downwardly, assuming the obliquely angled position illustrated in FIG. 6, and providing a generally unobstructed path immediately above the stripping means, the purpose of which is more fully set forth below particularly with reference to FIGS. 7 and 8.

Figure 8:
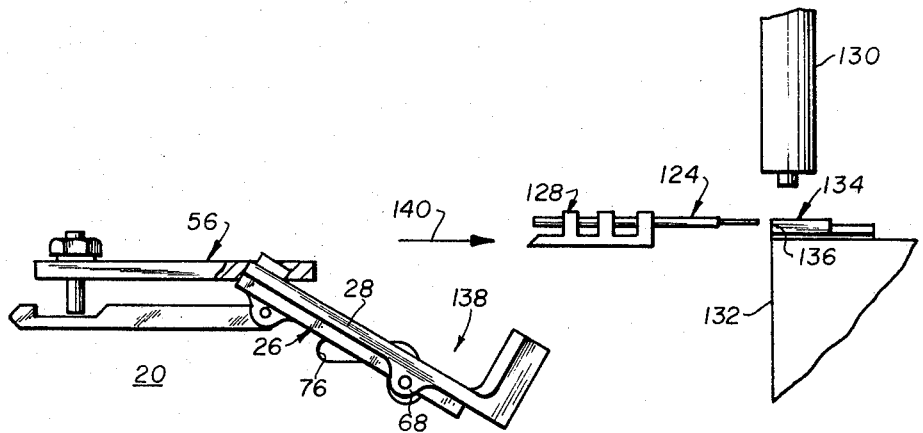
FIG. 8 is a side elevational view, partly in section, of the apparatus of FIG. 7 showing the wire stripping means and slide member planarly rotated away from the stripping zone and the stripped wire linearly advanced towards the crimping station.

Referring now to FIGS. 7 and 8, there is shown a stripping apparatus 20 in operative cooperation with a typical wire holding and transfer means 128. In FIG. 7, wire holding and transfer means 128 is disposed in a stripping zone immediately above first member 26 and stripping means 28, 30 of stripping apparatus 20, so as to appropriately position a predetermined length of insulated wire 124 intermediate the cutting blades 38, 40 (not visible) movably disposed adjacent the first ends 32, 34 of stripping means 28, 30. Blades 38, 40 have been coactingly urged together immediately adjacent the forward end 126 of wire 124 and in cutting contact with the insulation thereof, as drive member 56 has been advanced a first predetermined distance. Immediately forward of the wire holding and transfer means 128 and suitably retained in axial alignment therewith is the wire receiving portion 136 of a wire terminal 134 positioned intermediate the upper and lower portions 130 and 132, respectively, of a crimping device. As drive member 56 is advanced, blades 38, 40 are maintained in closed relationship about the severed insulation adjacent first end 126 of wire 124. During this portion of the stripping cycle, wire holding and transfer means 128 is held stationary permitting the forward movement of stripping means 28, 30 to remove the previously severed insulation from the front end 126 of wire 124. As drive means 56 is further advanced in a forward direction towards the right of FIG. 8, first member 26 and stripping means 28, 30 coupled thereto are planarly rotated downwardly as indicated by arrow 138 and away from the previously defined stripping zone, providing an unobstructed path for the direct forward linear displacement, as directionally indicated by arrow 140, of wire holding and transfer means 128 and the stripped wire 124 rigidly secured within the jaws thereof, wire 124 being thus accurately and conveniently transferred along a single path from the stripping zone to the wire receiving portion 136 of terminal 134 in the crimping zone, precluding the necessity for either laterally or rotationally displacing wire 124 in a multistage transfer operation to effect the required repositioning thereof. It should be understood that the stripped wire may be transferred to other than a crimping station for a subsequent operation or may be removed from the wire holding and transfer means upon the completion of the stripping operation without departing from the spirit of the invention. Further, it should be obvious to those skilled in the art that although the embodiment of the invention has been disclosed as particularly applicable to a wire stripping apparatus, its use is not intended to be restricted thereby.

The embodiments of the invention in which an exclusive property or privilege is claimed are defined as follows:

1. In a wire stripping apparatus of the type having wire holding and transfer means for transferring a wire from a stripping zone to a second zone generally forward of the stripping zone, the improvement comprising: a base member having a pair of upstanding sides; stripping zone adapted to receive therein an insulated wire; first means movably coupled to said base member intermediate said sides thereof and planarly rotatable towards and away from said stripping zone; a pair of adjoining wire insulation stripping means pivotally coupled to said first means and laterally operable towards and away from each other adjacent said stripping zone; drive means operable in a first and a second direction; second means operatively coupling said drive means to said stripping means for laterally operating said stripping means; and third means selectively coupling said drive means to said first means, wherein upon the actuation of said drive means a predetermined distance in a first direction, said stripping means are caused to be laterally operated in stripping engagement with a predetermined selective portion of an insulated wire disposed in said stripping zone, and upon the further movement of said drive means an additional predetermined distance in said first direction said first means is caused to be planarly rotated away from said stripping zone.

2. The improvement as defined in claim 1 wherein said drive means has a slotted portion therein selectively contoured to receive in cooperable engagement said second means.

3. The improvement as defined in claim 1 wherein said first means comprises pivot means coupled thereto and engageable with complementarily contoured opposing adjacent portions of said stripping means.

4. The improvement as defined in claim 1 further comprising pneumatic means coupled to said drive means for the actuation thereof.

5. The improvement as defined in claim 1 wherein said drive means is movably couple to said base member.

6. The improvement as defined in claim 5 wherein said drive means is movably coupled to said base member intermediate said upstanding sides thereof.

7. The improvement as defined in claim 5 wherein said drive means has a slotted portion therein selectively contoured to receive in cooperable engagement said second means.

8. The improvement as defined in claim 1 further comprising latch means releasably engaged between said first means and said base member to at least partially restrain the movement of said first means upon the actuation of said drive means in said first direction.

9. The improvement as defined in claim 8 wherein said drive means further comprises latch release means coupled thereto cooperatively engageable with said latch means to effectuate the release of said latch means as said drive means is moved in said first direction.

10. The improvement as defined in claim 9 wherein said latch release means is a pin coupled to one end of said drive means generally adjacent said latch means.

11. The improvement as defined in claim 1 wherein said stripping means has a first end and a second end, said first end having coupled thereto cutting blades arranged to selectively cut the insulation circumjacent an insulated wire disposed therebetween.

12. The improvement as defined in claim 11 wherein said third means is selectively coupled to said stripping means generally adjacent said second end of said stripping means.

13. The improvement as defined in claim 11 wherein said second means is coupled to said stripping means generally adjacent said second end of said stripping means.

14. The improvement as defined in claim 13 wherein said second means comprises a pair of upstanding rotatable members.

15. The improvement as defined in claim 14 wherein said drive means has a slotted portion therein selectively contoured to receive in cooperable engagement said upstanding rotatable members.

16. The improvement as defined in claim 1 wherein said first means comprises at least one first engaging means coupled thereto and cooperable with an adjacent portion of a first of said upstanding sides of said base member to permit the planar rotation of said first means.

17. The improvement as defined in claim 16 wherein said adjacent portion of said base member first upstanding side has receiving means for the receipt therein of said first engaging means.

18. The improvement as defined in claim 17 wherein said first engaging means is a roller and said receiving means comprises a slotted portion selectively contoured to permit said roller to be slidingly received therein.

19. The improvement as defined in claim 16 wherein said first means comprises a pair of laterally disposed first engaging means coupled thereto, each cooperable with an adjacent portion of an associated one of said upstanding sides of said base member.

20. The improvement as defined in claim 19 wherein each of said adjacent portions of said base member upstanding sides has receiving means for the receipt therein of an associated one of said first engaging means.

21. The improvement as defined in claim 20 wherein said engaging means is a pair of rollers and said receiving means comprises associated slotted portions adjacent said rollers selectively contoured to permit said rollers to be slidingly received therein.

* * * * *